(12) United States Patent
Millar

(10) Patent No.: US 7,013,702 B1
(45) Date of Patent: Mar. 21, 2006

(54) DYNAMIC PRESSURE GENERATOR

(75) Inventor: Huntly D. Millar, Houston, TX (US)

(73) Assignee: Millar Instruments, Inc., Houston, TX (US)

( * ) Notice: Subject to any disclaimer, the term of this patent is extended or adjusted under 35 U.S.C. 154(b) by 68 days.

(21) Appl. No.: 10/326,829

(22) Filed: Dec. 20, 2002

(51) Int. Cl.
*G01L 27/00* (2006.01)

(52) U.S. Cl. .................. 73/1.63; 73/1.64; 73/1.66; 73/1.68

(58) Field of Classification Search ............. 73/1.63, 73/1.64, 1.66, 1.68, 865.6, 1.57
See application file for complete search history.

(56) References Cited

U.S. PATENT DOCUMENTS

| | | | | |
|---|---|---|---|---|
| 4,189,936 A | * | 2/1980 | Ellis | ............................ 73/1.66 |
| 4,372,148 A | | 2/1983 | Cieutat | |
| 4,464,123 A | * | 8/1984 | Glover et al. | ................. 73/1.66 |
| 4,610,256 A | | 9/1986 | Wallace | |
| 4,672,974 A | | 6/1987 | Lee | |
| 5,246,353 A | * | 9/1993 | Sohn | ........................ 417/413.1 |
| 5,919,221 A | | 7/1999 | Miesel | |
| 6,056,697 A | | 5/2000 | Owens et al. | |
| 6,581,436 B1 | * | 6/2003 | Mannhart | .................... 73/1.68 |

FOREIGN PATENT DOCUMENTS

| | | |
|---|---|---|
| EP | 0 888 744 | 12/1999 |
| WO | 00/42407 | 7/2000 |

* cited by examiner

*Primary Examiner*—John E. Chapman
*Assistant Examiner*—Nashmiya Fayyaz
(74) *Attorney, Agent, or Firm*—Charles D. Huston; Daffer McDaniel, LLP

(57) ABSTRACT

A device, system, and method for determining the sensing performance of pressure-sensing devices. The device generates dynamic pressure waveforms that enable researchers and medical personnel to accurately assess the characteristics and performance of a particular pressure-sensing device. The system and methods allow for comparison of performance between two or more pressure-sensing devices, including catheter tip pressure transducers and fluid-filled catheters. The system may also be used to practice priming and preparing catheters for insertion into a living body, as the system provides immediate feedback that may indicate the presence of air in the system.

7 Claims, 2 Drawing Sheets

DYNAMIC PRESSURE GENERATOR

BACKGROUND OF THE INVENTION

1. Field of the Invention

The present invention relates generally to the field of dynamic pressure generators in biomedical applications. More particularly, it concerns an apparatus and method for dynamically generating pressure waveforms representative of fluid pressure waveforms found in living bodies.

2. Description of Related Art

Pressure sensor modules and catheters have been used to measure the pressure of various bodily fluids, such as blood and intracranial fluid. Prior art systems have been developed to calibrate pressure sensors, particularly catheter tip pressure sensors, as a way to improve pressure readings of bodily fluids. These prior art systems fail, however, to provide accurate measurements. For example, prior art systems, such as U.S. Pat. No. 6,056,697, disclose methods and systems for calibrating catheter tip pressure transducers employed for measuring blood pressure within a living body. In U.S. Pat. No. 6,056,697, Owens et al. teach inserting the catheter tip pressure transducers in saline solutions at specified depths for the purpose of calibrating the device based on hydrostatic pressures. While Owens et al. describe calibrating systems using static pressure, they fail to teach the use of calibrating pressure-sensing catheters using dynamic pressures.

Another aspect of the shortcomings of this type of existing device for producing pressures is the lack of feedback relating to the preparation of the device for insertion into a body. For example, in fluid-filled catheters, it is desirable to remove all air bubbles from the system, as the presence of compressible air in incompressible fluid produces flattened waveforms when viewed on a monitor. Under static pressure conditions, the presence of air may be unnoticeable. Under dynamic pressure conditions, however, the compression and expansion of air bubbles in a fluid-filled catheter are noticeable. In order to eliminate these errors, researchers and other individuals that use fluid-filled catheters must practice preparing the catheters, including removing the air from the catheter. Some prior art systems, however, generally use static pressures, and therefore do not provide quality feedback as to whether the air was successfully removed from the system. It is therefore desirable to provide a system for providing immediate feedback relating to the preparation of a pressure-sensing device for insertion into a body.

Related to the existence of air bubbles in the system are the characteristics and performance of the pressure-sensing device. For example, in fluid-filled catheters, there is a certain volume of fluid inside the catheter. Associated with this volume of fluid is a certain frequency (dynamic) response of the system. At the natural frequency of the system, the pressure seems larger than normal, and above a certain frequency the fluid loses the ability to move fast enough to detect changes in the pressure waveform. The natural frequency for a fluid-filled pressure-sensing catheter for use in a mouse heart is much different than the natural frequency for a fluid-filled pressure-sensing catheter for use in a human heart. As the heart rate nears the natural frequency for the catheter, errors are introduced into the pressure measurements. Many prior art systems fail to address this type of error. Instead, these systems use static pressures to determine characteristics of pressure-sensing systems. It is therefore desirable to provide a system for determining the dynamic pressure-sensing characteristics and performance of pressure-sensing devices. It is further desirable to provide a system for determining the dynamic response characteristics of catheters, interconnecting tubing and fittings. It is further desirable to be able to measure dynamic fluid pressures without interference from the natural frequency of the pressure generator.

It is further desirable to be able to compare characteristics of different sensors. There are numerous drawbacks to using only static pressures for calibrating sensors and sensing devices. One drawback is that animal fluid pressures (e.g. blood pressure) are not generally static. Therefore, a static comparison of accuracy or consistency of sensing performance between two pressure sensors may or may not be correct. It is therefore desirable to provide a system for comparing the dynamic pressure-sensing characteristics and performance of two or more pressure-sensing devices.

It is therefore desirable to provide a system and method for verifying the accuracy of a pressure sensor for use in a living body.

U.S. Pat. No. 4,372,148, issued to Cieutat, discloses a pressure generator for producing a variable pressure, variable frequency waveform to test a blood pressure measuring system for resonance or damping. However, Cieutat uses a jet of gas on the paddle wheels of a turbine to turn a wheel to produce the desired pressure waveform. It is desirable to provide a dynamic pressure waveform generator that may generate a waveform directly without complex operating mechanisms.

U.S. Pat. No. 4,189,936, issued to Ellis, discloses a pressure generator for producing a pressure variation pattern, and further describes the use of a pressure generator in a high compliance pressure-simulating device. However, Ellis' use of a piston and a second chamber are counterintuitive to a high frequency (high compliance) dynamic pressure waveform, generator. It is desirable to provide a high frequency response dynamic waveform generator.

SUMMARY OF THE INVENTION

The present invention overcomes the shortcomings of the prior art with a method for testing the dynamic sensing capabilities of pressure sensors. A high frequency response apparatus is described herein for generating variable pressures in a chamber such that pressure-sensing catheters may be tested for accuracy and calibrated.

It is an object of the present invention to provide a teaching tool for instruction on proper methods and protocols related to priming and preparing fluid-filled pressure transducers for use in a living body. The present invention provides a clear demonstration of the distorting effects of resonance, bubbles, and catheter whip on pressure measurements.

It is a feature of this invention to calibrate catheter tip pressure transducers using dynamic pressure generation. It is a further feature of the present invention to calibrate catheter tip pressure transducers based on dynamic pressure waveforms similar to those found in living bodies.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

The present invention overcomes the shortcomings of the prior art by providing a high frequency response device for generating dynamic pressures, and a method for producing dynamic pressure waveforms. The device is advantageous over some prior art systems by providing dynamic pressures as opposed to static pressure, thereby enabling users to determine accurate pressure readings in a realistic operating environment. The present invention is advantageous over other dynamic pressure generators by providing a high-frequency response pressure generator.

Figure 1:
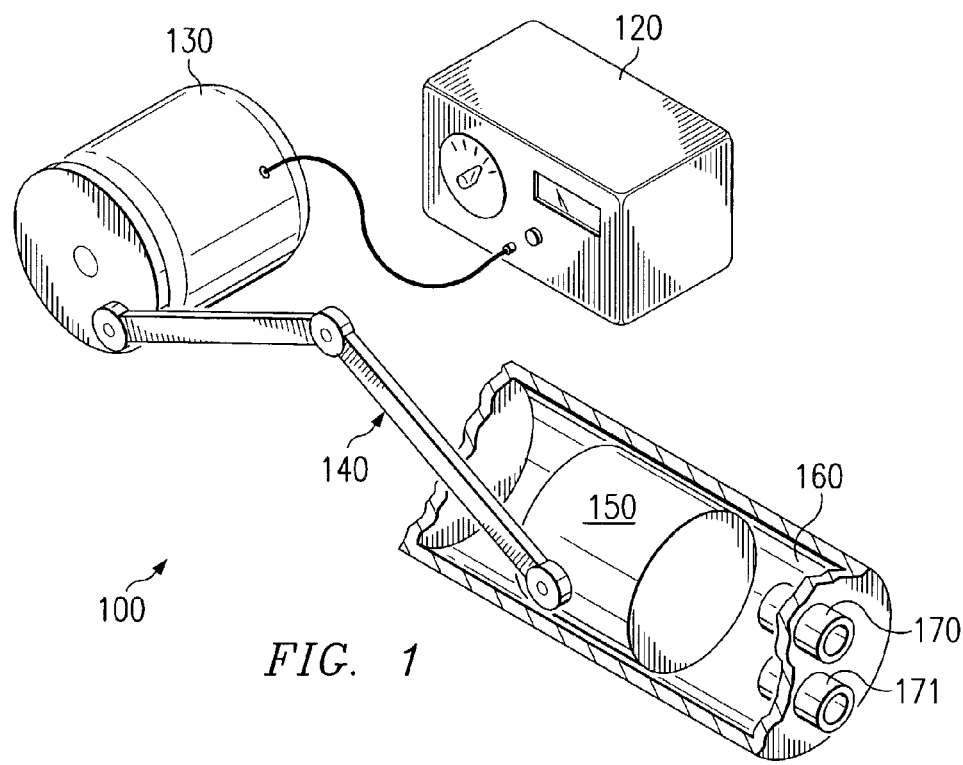
FIG. 1 is a simple perspective view of a dynamic pressure generator in accordance with one embodiment of the present invention.

Referring now to the drawings, FIG. 1 is a simple perspective view of a dynamic pressure generator 100 in accordance with one embodiment of the present invention. As shown in FIG. 1, the dynamic pressure generator 100 comprises a controller 120, a motor 130, a sliding bar mechanism 140, a dashpot 150, a chamber 160, and receptacles 170 and 171 for pressure sensors.

The output mechanism of motor 130 is connected to the sliding bar mechanism 140. The motor 130 may be either AC or DC, but preferably capable of producing a range of rotational speeds proportional to the dynamic fluid pressure frequencies found in various animals. For example, the range of heart rates may include earthworm heart rate frequencies of approximately 5 beats per minute and murine (mouse) heart rates of approximately 300 beats per minute. In a preferred embodiment, motor 130 is capable of producing rotational output speeds up to at least 400 rpm.

The controller 120 controls the rotational speed of the motor. The controller 120 may employ a turnable knob, a movable switch or lever, a computer-based controller, or any other device or method for controlling the output speed of the motor 130 without departing from the scope of the invention.

The sliding bar mechanism 140 is connected to the motor output at one end and the dashpot 150 at the other end. The sliding bar mechanism 140 is a common device useful for transforming the rotational output created by the motor 130 into the translational movement of the dashpot 150. Ideally, dashpot 150 and sliding bar mechanism 140 are low-mass elements to improve the frequency response of the system, reduce heat build up, and place less stress on motor 130.

The clearance between the dashpot 150 and the chamber 160 is preferably small enough to enable the pressure generator 100 to produce pressures similar to those found in animals, but large enough to reduce friction. If the clearance is too large, air or any other fluid used in the system 100 may be able to escape past the dashpot 150 during the compression stage, thereby preventing pressure from building up, resulting in decreased accuracy of the pressure measurement. If the clearance between the dashpot 150 and the wall is too small, friction forces may become significant, and large friction forces require a larger motor 130, as well as increase errors due to heat build up. In a preferred embodiment of the present invention, the dashpot 150 is constructed of a low friction graphite plug machined for close tolerances. The close tolerance ensures the device 100 will be able to produce pressure with minimal friction due to design, and the graphite provides additional friction reduction and durability, with a reduced weight.

The pressure generator 100 includes receptacles 170, 171 for pressure-sensing devices so that a pressure reading may be taken inside the chamber 160 near the essentially closed end. By coupling the pressure sensor directly to the chamber 160 and transmitting a signal representative of pressure exerted on the pressure sensor in receptacle 170 or 171 to a monitor, the pressure-sensing capabilities of the pressure-sensing device may be observed dynamically. In a preferred embodiment, the pressure generator 100 provides two receptacles 170, 171. By providing two or more receptacles 170, 171 the pressure generator 100 enables users to compare waveform detection capabilities between multiple pressure-sensing devices measuring the same pressure waveform. The receptacles 170, 171 are capable of accepting universal fittings so that any pressure-sensing device designed for use in a body may be coupled to the pressure generator 100 of the present invention. Such pressure-sensing devices include high-fidelity pressure transducers and fluid-filled catheters. In one embodiment, the pressure generator 100 includes a permanent high-fidelity pressure-sensing device capable of providing a very accurate baseline measurement.

Signals from the pressure-sensing devices are typically displayed on a monitor or oscilloscope, or printed or plotted on paper. In some instances, a monitor displays the output, enabling a user to immediately see the waveform detected by a pressure-sensing device. Advantageously, this gives the user immediate feedback into the performance of the pressure-sensing device. Users may use this information to improve their skills with fluid-filled pressure-sensing catheters (e.g. the existence of a bubble of air in a fluid-filled catheter is easily confirmed after comparison with a high-fidelity pressure sensor detecting the same waveform). Users may also compare the performance of different catheters, pressure sensors, and techniques. Additionally users may calibrate the output of a pressure-sensing device.

Figure 2:
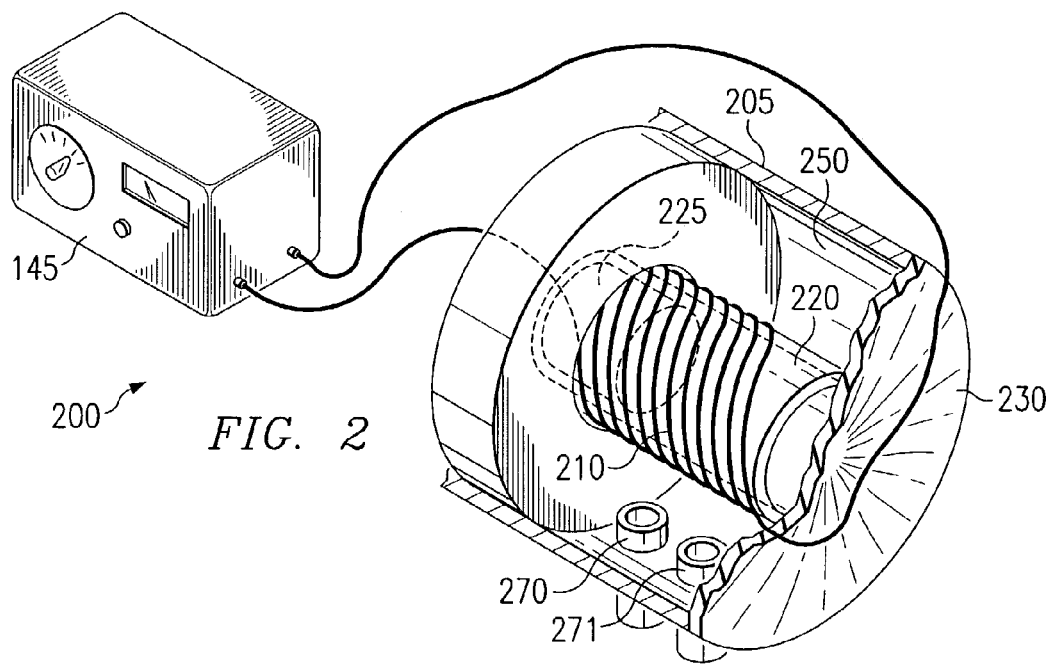
FIG. 2 is a simple perspective view of a dynamic pressure generator in accordance with another embodiment of the present invention.

FIG. 2 is a simple perspective view of a pressure generator 200 in accordance with another embodiment of the present invention. In this embodiment, pressure is generated through the use of a transducer similar to the transducer found in speaker drivers. The pressure generator 200 of the present invention comprises a signal generator 145 and a transducer 205 manufactured with receptacles 270 and 271.

The transducer 205 generally comprises a movable coil 210 on a cylindrical form 220 that is held in a circular gap in a strong magnetic field produced by magnet (not shown). The cylindrical form 220 is held in the circular gap by flexible diaphragm 230. The diaphragm 230 connects to the body of transducer 205 to form chamber 250.

The movable coil 210 is supported by a flexible diaphragm 230 that moves in accordance with forces generated by the movement of movable coil 210 in the magnetic field. The diaphragm 230 is generally made of a material designed to allow enough air to release so that the pressure does not build up behind the diaphragm 230, but there is a damping effect so that the movable coil 210 does not overshoot at its resonant frequency. For the present invention, the pressure generator 200 generally has a resonant frequency of about 500 cycles per second.

The chamber 250 formed in part by at least a portion of the diaphragm 230, is a sealed-off area where air is compressed and decompressed as the movable coil 210 moves in and out of the magnetic field. In the present invention, the chamber 250 is sealed off by covering over the flexible diaphragm 230 with, for example, a silicone-rubber sealant such as RTV. The silicone-rubber sealant permits the movable coil 210 to move in and out freely. Pressure is generated inside the chamber 250. A small transducer 205 is able to develop 30–40 mm Hg of pressure, which is adequate for testing pressure-sensing devices for their frequency response.

Advantages to this embodiment of the present invention will be apparent to those skilled in the art. The use of a silicone-rubber sealant to seal off the diaphragm 230, thus enabling the apparatus to generate higher pressures with fewer parts, is advantageous because the smaller transducer 205 requires less space. Also, the weight of the system is decreased, therefore allowing the resonant frequency to remain as high as possible; a dashpot, motor, and sliding bar mechanism are not required in this embodiment. Another advantage is the device 200 may be easier to make using commercially available devices with little modification.

The transducer 205 used in the pressure generator 200 is operable to generate pressure waveforms adjustable in amplitude, frequency, and waveform. The pressure waveforms may be generated to simulate a pressure waveform with a frequency or amplitude found in a body vessel. Transducer 205 may generate pressure waveforms from internal sources or external sources. In some embodiments, the pressure waveform may be a sine, square, or triangular waveform generated by an internal source. In other embodiments, the pressure waveform may be a periodic waveform. In other embodiments, the transducer 205 may be able to produce random waveforms. In some embodiments, the amplitude may vary. In some embodiments, the waveform constantly changes. Transducer 205 may also be operable to generate a pressure waveform signals provided by an external source, such as a tape player or pressure simulator.

Figure 3:
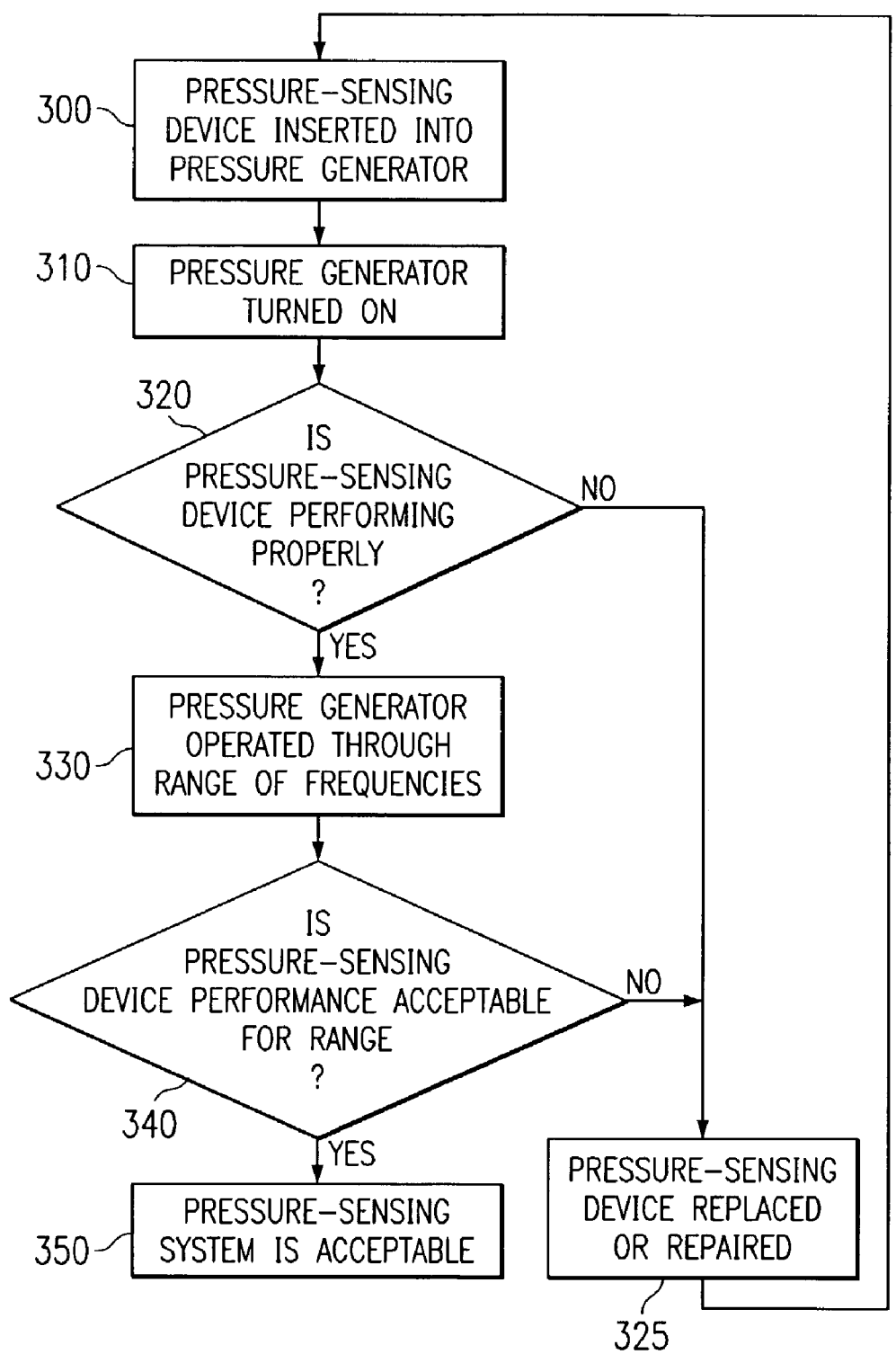
FIG. 3 is a process flow diagram of a process for using a pressure generator to evaluate the performance of a pressure-sensing system in accordance with the present invention.

Now referring to FIG. 3, a flowchart shows steps for using the device of the present invention described above. In step 300, the user connects a pressure-sensing device into a receptacle. The receptacle has a fitting capable of accepting any pressure-sensing device that may be used in a body. If the pressure-sensing device is a fluid-filled catheter, the catheter is primed and prepared beforehand so that ideally all air is removed from the system. Step 300 is repeated for each pressure-sensing device. In an alternative embodiment, the present invention may have a permanent high-fidelity pressure sensor inserted into one receptacle so that a highly accurate baseline may be used to verify a new pressure-sensing device. In other embodiments, there are multiple receptacles to enable users to compare two or more pressure sensors.

In step 310, the device of the present invention is turned on and the device is set to a frequency. The frequency is generally greater than 1 cycle per minute in order to generate dynamic pressure waveforms.

In step 320, it is determined whether the pressure-sensing device is performing correctly. For example, in cases in which a high-fidelity pressure sensor and a fluid-filled catheter system are simultaneously measuring the pressure, a flattened waveform output by the fluid-filled catheter may indicate air in the catheter system. Also in these cases, differences between fluid-filled catheters and high-fidelity pressure sensors, particularly the noise associated with fluid-filled catheters, may be easily observed. Differences in catheters may be the result of different bores, lengths, or consistency, or a combination thereof. The ability to test the performance of a pressure-sensing device, compare the detection capabilities of two or more pressure-sensing devices, and identify sources for error in pressure-sensing devices is highly advantageous to researchers. The capability for an individual to practice preparing a pressure-sensing device, particularly a fluid-filled catheter, for insertion into a body, and the ability to receive instant feedback on at least part of the protocol is also advantageous to researchers and medical personnel.

In some instances, errors may occur in the preparation or priming of a fluid-filled catheter, or in the insertion of a fluid-filled catheter into a receptacle in the present invention, thereby resulting in poor performance of the pressure-sensing device. In step 325, if a pressure-sensing device is observed to be performing poorly, the device is disconnected from the receptacle, re-prepared, and re-inserted into the receptacle. Alternatively, a replacement pressure-sensing device is inserted.

In step 330, a pressure generator of the present invention is adjusted via the controller through a range of frequencies near a target frequency. For example, if the pressure-sensing device is desired to test resting heart rates between 60–70 beats per minute, the pressure generator may be adjusted through a range of frequencies capable of producing simulated heart rates between 50–90 beats per minute. Advantageously, this may help users identify a natural frequency for the pressure-sensing device, a preferred range of use for a pressure-sensing device, or an upper or lower limit for performance of the pressure-sensing device. In this example, if operating the pressure generator at a rate between 50–90 beats per minute and evaluating a fluid-filled catheter identifies a natural frequency at 70 beats per minute—thereby affecting the pressure readings—a researcher may want to change pressure-sensing devices or calculate the error associated with the pressure-sensing device. Also, above the upper limit for a particular pressure-sensing device, the pressure-sensing device may be over-damped and perform poorly. As those skilled in the art will readily appreciate, the ability to evaluate a pressure-sensing device over a target range of frequencies and the ability to identify frequencies and ranges of frequencies that affect the performance of the pressure-sensing device are highly advantageous.

In step 340, the pressure-sensing device is evaluated for a desired performance and verified to be acceptable for the target frequency or range of frequencies. If the pressure-sensing device is unable to perform over the desired frequency, amplitude, or waveform, then in step 325, the device is either repaired or replaced, depending on the nature of the deficiency or failure. If the pressure-sensing device is determined to be performing properly, the device is deemed acceptable (in step 350) for use in detecting pressures in body vessels.

The preceding examples are included to demonstrate specific embodiments of the invention. It should be appreciated by those of skill in the art that the techniques disclosed in the examples represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

What is claimed is:

1. A dynamic pressure waveform generator comprising:
  a controller operable to produce electronic signals over a range of frequencies, amplitudes and waveforms, wherein said electronic signals are representative of a fluid pressure in a living body;

a transducer operable to convert said electronic signals into a dynamic pressure waveform, wherein said transducer comprises:
  a magnet;
  a movable coil, wherein said electronic signals pass through said movable coil to induce a magnetic field in said movable coil, and wherein said movable coil is attracted to or repelled by said magnet based on said electronic signals passed through said movable coil;
  a diaphragm connected to said movable coil; and
  a chamber, wherein said chamber is sealed at least in part by said diaphragm, which forms at least a portion of said chamber and an outer surface of said transducer, and wherein a movement of said movable coil generates said dynamic pressure waveform inside said chamber; and
  one or more receptacles connected to said chamber for coupling one or more pressure-sensing devices to said chamber.

2. The dynamic pressure waveform generator of claim 1, wherein at least one of said pressure sensing devices is a high-fidelity pressure sensor.

3. The dynamic pressure waveform generator of claim 1, wherein said one or more pressure-sensing devices comprises a catheter tip pressure transducer.

4. The dynamic pressure waveform generator of claim 1, wherein said one or more pressure-sensing devices comprises a fluid-filled catheter pressure transducer.

5. The dynamic pressure waveform generator of claim 1, wherein the transducer comprises two or more receptacles for coupling two or more pressure-sensing devices to said chamber, so that a performance of the two or more pressure-sensing devices can be compared when measuring the same dynamic pressure waveform.

6. The dynamic pressure waveform generator of claim 1, wherein the dynamic pressure waveform generated inside said chamber comprises a resonant frequency selected from a range of frequencies extending up to about 500 cycles/second.

7. The dynamic pressure waveform generator of claim 1, wherein the dynamic pressure waveform generated inside said chamber comprises a pressure of about 30 mmHg to about 40 mmHg.

* * * * *

UNITED STATES PATENT AND TRADEMARK OFFICE
CERTIFICATE OF CORRECTION

PATENT NO. : 7,013,702 B1  Page 1 of 1
APPLICATION NO. : 10/326829
DATED : March 21, 2006
INVENTOR(S) : Millar It is certified that error appears in the above-identified patent and that said Letters Patent is hereby corrected as shown below:

In the Claims:

Col. 7, line 11: After the phrase "to said movable coil", please delete "and".

Signed and Sealed this

Fourteenth Day of November, 2006

JON W. DUDAS
*Director of the United States Patent and Trademark Office*